United States Patent
Ruetschi

(10) Patent No.: US 7,187,764 B2
(45) Date of Patent: Mar. 6, 2007

(54) AUTOMATIC SPEAK-UP INDICATION FOR CONFERENCE CALL ATTENDEES

(75) Inventor: Johannes Ruetschi, Delray Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 526 days.

(21) Appl. No.: 10/421,466

(22) Filed: Apr. 23, 2003

(65) Prior Publication Data

US 2004/0213402 A1    Oct. 28, 2004

(51) Int. Cl.
*H04M 3/56* (2006.01)
*H04M 9/02* (2006.01)
*H04L 12/16* (2006.01)

(52) U.S. Cl. ............. 379/202.01; 370/260; 379/388.06

(58) Field of Classification Search ............. 370/259, 370/260, 261, 262, 263, 264, 265, 266, 267, 370/268, 269, 270, 271; 379/201.01, 202.01, 379/203.01, 204.01, 205.01, 206.01, 388.06
See application file for complete search history.

(56) References Cited

U.S. PATENT DOCUMENTS

| 4,658,425 | A | 4/1987 | Julstrom | 381/81 |
|---|---|---|---|---|
| 4,965,822 | A | 10/1990 | Williams | 379/390 |
| 6,643,373 | B1 | 11/2003 | Hughes | 379/433.04 |
| 6,888,935 | B1 * | 5/2005 | Day | 379/202.01 |
| 2002/0150220 | A1 | 10/2002 | Weinman, Jr. | 379/88.13 |

FOREIGN PATENT DOCUMENTS

EP    0 659 006    6/1995

* cited by examiner

*Primary Examiner*—Harry S. Hong

(57) ABSTRACT

A conference call arrangement, conferencing device, conference unit and a method of managing conference calls. The conferencing device may be a speakerphone with a speak up indicator. Whenever a conference call attendee does not speak loudly enough for remote participants, the conference unit sends a speak up indication to a corresponding conferencing device.

20 Claims, 2 Drawing Sheets

AUTOMATIC SPEAK-UP INDICATION FOR CONFERENCE CALL ATTENDEES

BACKGROUND OF THE INVENTION

1. Field of the Invention

The present invention is related to telephones and more particularly to telephones having a hands-free mode of operation.

2. Background Description

Typical state-of-the-art telephones often have a hands-free or speakerphone mode of operation, hereinafter generically "speakerphone." Such a telephone may be located at a convenient location and placed in hands-free mode. Thereafter, speakers, e.g., teleconference participants, may remain stationary or move about within range of the speakerphone as desired. The speakerphone microphone picks up all surrounding sound including background noise. This sound is transmitted to a listener at the other end of the call.

The typical speakerphone is voice switched, either sending (voice) or receiving and "on speaker." Unless someone, e.g. a meeting attendee in the vicinity of the speakerphone, is speaking or making some noise, the speakerphone is in receive mode, playing what someone on a phone or, a conference call attendee on another speakerphone, is saying at the other end. When someone speaks or makes a noise in the vicinity of the speakerphone, the speakerphone switches to send mode, sending whatever initiated the switch to the other end.

Occasionally, a call participant may speak loud enough to switch speakerphone mode but, not loud enough to be heard or, the speaker may wander too far from the speakerphone or just be too far away. Since the speakerphone is switched to send mode, the speaker hears nothing said by anyone at the other end, i.e., at any other conference call station. Until the speaker finishes no one can contact him/her. There is nothing that anyone at the other end can do to inform the speaker that he/she is not being heard. This can be a frustrating experience both for the speaker (e.g., being asked to "repeat everything after. . . ") and for those at the other end, sitting on their hands, waiting for a pause to ask the speaker to "repeat everything after. . ." or, even, "everything that was just said."

Thus there is a need for a way to inform conference call speakers when they are not speaking loudly enough for speakerphone broadcast.

SUMMARY OF THE INVENTION

It is a purpose of the invention to improve the quality of conference calls;

It is another purpose of the invention to automatically notify conference call participants when they are not speaking loudly enough to be clearly heard by remote participants;

It is yet another purpose of the invention to automatically provide a speak up indication to a conference call participant not speaking loudly enough to be clearly heard by remote participants.

The present invention relates to a conference call arrangement, conferencing device, conference unit and a method of managing conference calls. The conferencing device may be a speakerphone with a speak up indicator. Whenever a conference call attendee does not speak loudly enough for remote participants, the conference unit sends a speak up indication to a corresponding conferencing device.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
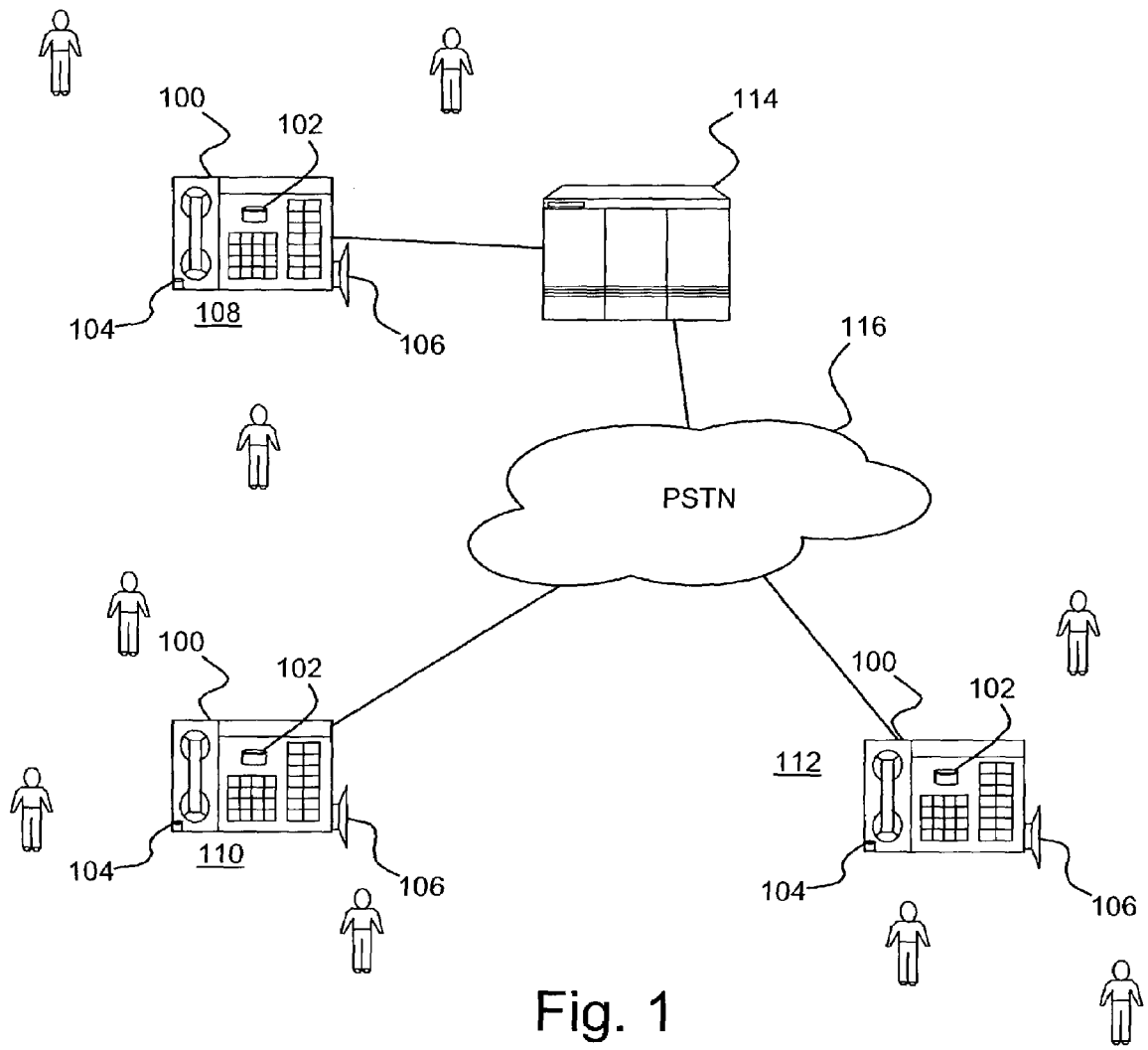
FIG. 1 shows an example of preferred embodiment endpoint devices or speakerphones with a hands-free mode of operation in a conference call.

Turning now to the drawings and, more particularly, FIG. 1 shows an example of preferred embodiment conference call arrangement with conferencing devices or speakerphones 100 having a hands-free or conference call mode. Each of the speakerphones 100 includes a speak up indicator 102, a microphone 104 and a speaker 106. In this example, each of the speakerphones 100 is located at endpoint locations 108, 110, 112 that are remote to each other, e.g., conference rooms on opposite ends of a building, on different floors, in different cites, in different countries and etc. The speakerphones 100 may be connected through a communications server, e.g., a private branch exchange (PBX) 114, to a public network 116, e.g., a public switched telephone network (PSTN) or a data network such as the Internet.

During a conference call, attendees are at two or more endpoint locations 108, 110, 112. Whenever a participant speaks at one of the locations, e.g., 108, the local speakerphone 100 switches to send mode. A conference unit, e.g. in PBX 114, in the communications network 116 or, in the speakerphones 100, monitors voice signals from the originating endpoint, 108 in this example. As long as the speakers speak loud enough or are close enough to the speakerphone 100 to be heard at the other end(s) (110 and/or 112 in this example), the conference call progresses normally. When the conference unit determines from the voice signal that the speaker is not speaking loudly enough to be heard at the other endpoints 110 and/or 112, the conference unit sends a speak up signal to the speakerphone 100. The speakerphone 100 warns the speaker by flashing speak up indicator 102 and/or audibly. Optionally, the speakerphone may provide only an audible speak up indication through the speaker 106, obviating the necessity of a separate speak up indicator 102.

Figure 2:
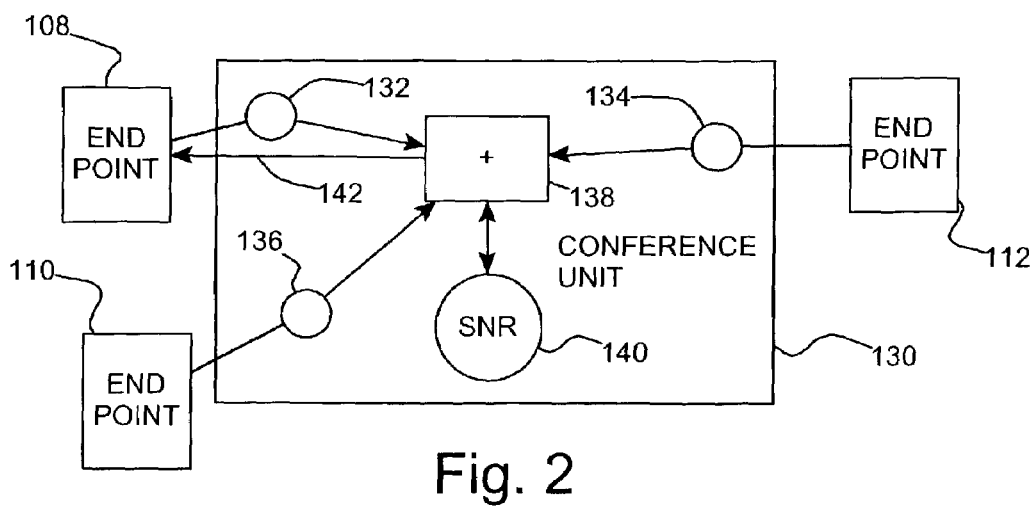
FIG. 2 shows a schematic example of the arrangement of FIG. 1, showing the conference unit 130 receiving voice input from endpoint locations.

FIG. 2 shows a schematic example of the arrangement of FIG. 1, showing the conference unit 130 receiving voice input from endpoint locations 108, 110, 112. The conference unit 130 includes measuring points 132, 134, 136 measuring incoming voice signals. Incoming voice signals are combined, e.g., in an Adder 138, and the result is returned to listening stations. A signal to noise measurement is made of the incoming signal, e.g., the current speaker's voice to background noise, in SNR comparison circuit 140. The SNR comparison circuit 140 compares the measurement results against a selected acceptable reference value. The reference value may be selected by design or by user input. If the SNR results indicate that a current speaker is not speaking loudly enough, the compare results provide a speak up signal that is passed back on a speak up signal line 142 to the originating location (108 in this example), e.g., to the speak up indicator 102 on the speakerphone 100. Preferably, the conference unit 130 is local to a particular endpoint 108, 110, 112, with a conference unit 130 at each, serving the particular endpoint 108, 110, 112.

Figure 3:
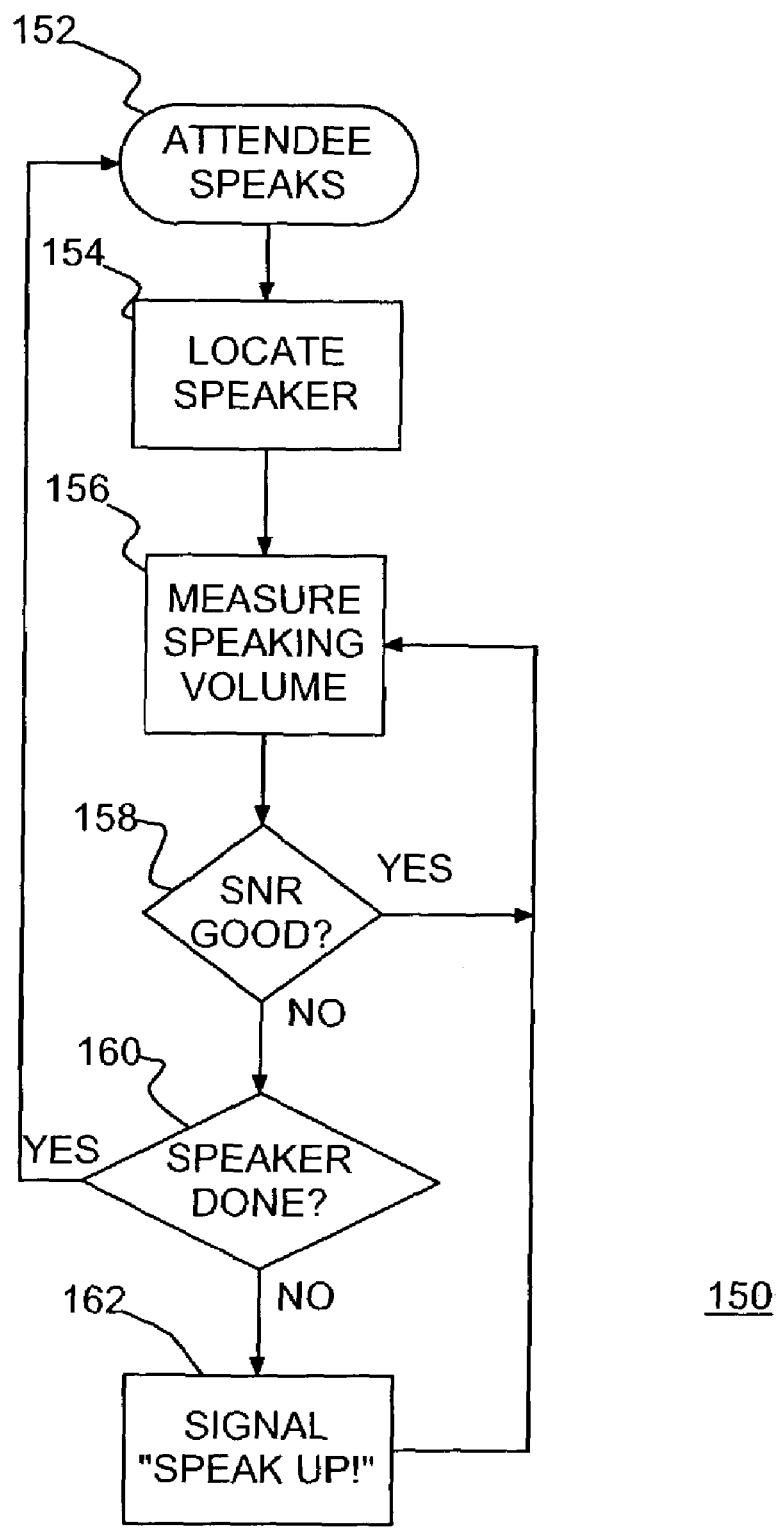
FIG. 3 shows a flow diagram example 150 of how a preferred embodiment system automatically provides speakers with a speak up indication.

FIG. 3 shows a flow diagram example 150 of how a preferred embodiment system automatically provides speakers with a speak up indication with reference to the schematic of FIG. 2. In step 152 a participant at one endpoint, e.g., 110, begins to speak. The local speakerphone (100) switches to send mode. In step 154 the conference unit 130 detects which endpoint 110 is currently sending voice. In step 156 the conference unit 130 measures the speaking volume, e.g., in measuring point 136. In step 158 the conference unit 130 determines whether the voice quality output is acceptable, e.g., by measuring the voice in measurement point 132 and comparing the voice measurement to background noise ratio (the signal to noise ratio) in SNR comparison circuit 140. The conference unit 130 may measure background noise at any point when no one is speaking. If the signal is sufficient, the conference unit 130 returns to step 156 continuing to monitor and measure. If, however, in step 158 the SNR comparison indicates that the voice quality is unacceptable (not loud enough) and, in step 160 the speaker has not finished speaking; then, in step 162 the conference unit 130 sends a "Speak Up" signal on signal line 142 to the originating endpoint 110. Upon receipt of the Speak Up signal, the speakerphone 100 passes the indication to the speaker. As noted hereinabove, the indication may be visual (e.g., a flashing light emitting diode (LED) in indicator 102) or audio (e.g. a beeping sound or a prerecorded message).

Thus, a conference call speaker is automatically prompted to speak up, whenever the speaker is not speaking loudly enough or, moves too far away from the speakerphone to be heard clearly by remote participants.

While the invention has been described in terms of preferred embodiments, those skilled in the art will recognize that the invention can be practiced with modification within the spirit and scope of the appended claims.

What is claimed is:

1. A conference unit for sensing whether conference call participants speak loudly enough to be clearly heard by remote conference attendees, said conference unit comprising:
   measuring points measuring voice signals from corresponding ones of connected conferencing devices;
   combining means for combining incoming voice signals from said conferencing devices;
   signal to noise comparison means comparing a received voice signal with background noise detected originating from one said conferencing device; and
   speak up signaling means for providing a speak up signal to said one.

2. A conference unit as in claim 1, wherein said combining means comprises an adder adding said incoming voice signals from said conferencing devices.

3. A conference unit as in claim 1, wherein said signal to noise comparison means comprises a signal to noise ratio measurement circuit measuring the voice signal to background noise ratio on each of said incoming voice signals.

4. A conferencing device for allowing parties at one location to conference with parties at another location, said conferencing device comprising:
   a microphone receiving local sound including voices of local conference attendees;
   a speaker playing voices of remote conference attendees;
   a speak up indicator providing an indication whenever a local voice source is not loud enough; and
   a conference unit sensing whether said local voice signal is loud enough to be clearly heard by remote conference attendees, said conference unit comprising:
      a plurality of measuring points measuring voice signals from connected conferencing devices:
      combining means for combining incoming voice signals from other said conferencing devices:
      signal to noise comparison means comparing a received voice signal from said voice source with background noise; and
      speak up signaling means for providing a speak up signal to said speak up indicator.

5. A conferencing device as in claim 4, wherein said speak up indicator is a light emitting diode.

6. A conferencing device as in claim 4, wherein said speak up indicator is an audible indication from said speaker.

7. A conferencing device as in claim 4, wherein said conferencing device is a speakerphone.

8. A conferencing device as in claim 4 wherein said combining means comprises an adder adding said incoming voice signals.

9. A conferencing device as in claim 4 wherein said signal to noise comparison means comprises a signal to noise ratio measurement circuit measuring the voice signal to background noise ratio on each of said incoming voice signals.

10. A conferencing device as in claim 4 wherein said conferencing device is a speakerphone containing said conference unit.

11. A conference call arrangement connecting a plurality of endpoints together for a conference call, said conference call arrangement comprising:
    a conferencing device at each conference endpoint relaying voices from said each endpoint to other conferenced endpoints and providing voices from said other conferenced endpoints to said each endpoint, said conferencing device comprising:
       a microphone receiving local sound including local voices,
       a speaker playing remote voices from other conferenced endpoints, and a speak up indicator providing an indication whenever said local voices are not loud enough to be heard at said other conferenced endpoints; and,
    a conference unit sensing whether said local voices are loud enough, said conference unit comprising:
       a plurality of measuring points measuring incoming said voice signals from a corresponding other connected said conferencing device at one of said conferenced endpoints,
       combining means for combining said incoming voice signals from said conferenced endpoints, combined said incoming voice signals being played at a corresponding said speaker,
       signal to noise comparison means comparing a received voice signal from one of said conferenced endpoints with background noise from said one, and
       speak up signaling means for providing a speak up signal to said speak up indicator at said one.

12. A conference call arrangement as in claim 11, wherein said speak up indicator on at least one said conferencing device is a light emitting diode.

13. A conference call arrangement as in claim 11, wherein said speak up indicator on at least one said conferencing device is an audible indication from said speaker.

14. A conference call arrangement as in claim 11, wherein at least one said conferencing device is a speakerphone.

15. A conference call arrangement as in claim 14, wherein said conference unit is in said speakerphone.

16. A conference call arrangement as in claim 11, further comprising a communications server, wherein said conference unit is in said communications server.

17. A conference call arrangement as in claim 11, wherein said signal to noise comparison means comprises a signal to noise ratio measurement circuit measuring the voice signal to background noise ratio on each said received voice signal.

18. A conference call arrangement as in claim 11, wherein said combining means comprises an adder adding said incoming voice signals.

19. A method of managing conference calls comprising the steps of:

a) identifying an incoming voice source;
    b) determining a signal to noise ratio (SNR) from said incoming voice source;
    c) comparing said SNR to a selected threshold level; and
    d) providing a speak up indication whenever said SNR is below said threshold level.

20. A method as in claim 19, wherein steps (b)–(d) are repeated until a voice signal is no longer detected from said incoming voice source, said method further comprising the step of:

e) waiting for receipt of a voice signal and, upon receipt of said voice signal returning to step (a) for identifying the source of said voice signal.

\* \* \* \* \*